United States Patent
Walker et al.

(10) Patent No.: US 6,692,439 B1
(45) Date of Patent: Feb. 17, 2004

(54) ANGULAR SCATTER IMAGING SYSTEM USING TRANSLATING APERTURES AND METHOD THEREOF

(75) Inventors: William F. Walker, Barboursville, VA (US); Michael Jason McAllister, Charlottesvile, VA (US); Gregg E. Trahey, Hillsborough, NC (US)

(73) Assignees: University of Virginia Patent Foundation, Charlottesville, VA (US); Duke University, Durham, NC (US)

( * ) Notice: Subject to any disclaimer, the term of this patent is extended or adjusted under 35 U.S.C. 154(b) by 0 days.

(21) Appl. No.: 10/030,958

(22) PCT Filed: Jan. 11, 2001

(86) PCT No.: PCT/US00/18652
§ 371 (c)(1),
(2), (4) Date: Jun. 3, 2002

(87) PCT Pub. No.: WO01/01866
PCT Pub. Date: Jul. 7, 2000

Related U.S. Application Data

(60) Provisional application No. 60/169,598, filed on Dec. 8, 1999, and provisional application No. 60/142,556, filed on Jul. 7, 1999.

(51) Int. Cl.[7] .................................. A61B 8/00
(52) U.S. Cl. ........................ 600/443; 600/447
(58) Field of Search ................ 600/437, 438, 600/439, 440–471; 73/597, 602, 607, 620–630, 633; 367/7, 11, 130, 138; 601/2–3; 128/916, 922, 923; 382/128, 294

(56) References Cited

U.S. PATENT DOCUMENTS

| | | | |
|---|---|---|---|
| 4,105,018 A | * | 8/1978 | Greenleaf et al. ............ 73/597 |
| 4,338,948 A | | 7/1982 | Perez-Mendez et al. |
| 4,817,614 A | * | 4/1989 | Hassler et al. .............. 600/441 |
| 4,867,167 A | | 9/1989 | Magnin |
| 5,268,876 A | | 12/1993 | Rachlin |
| 5,331,964 A | | 7/1994 | Trahey |
| 5,487,387 A | | 1/1996 | Trahey |
| 5,531,117 A | * | 7/1996 | Fortes ......................... 73/602 |
| 5,566,675 A | | 10/1996 | Li et al. |
| 5,673,699 A | | 10/1997 | Trahey et al. |
| 5,793,701 A | * | 8/1998 | Wright et al. .................. 367/7 |
| 5,797,845 A | | 8/1998 | Barabash et al. |
| 5,997,477 A | | 12/1999 | Sehgal |
| 6,016,285 A | | 1/2000 | Wright et al. |
| 6,027,447 A | | 2/2000 | Li et al. |
| 6,059,730 A | | 5/2000 | Miwa et al. |
| 6,063,033 A | | 5/2000 | Haider et al. |
| 6,068,597 A | | 5/2000 | Lin |
| 6,071,240 A | | 6/2000 | Hall et al. |
| 6,120,450 A | * | 9/2000 | Li ............................. 600/447 |

OTHER PUBLICATIONS

Walker, W.F., et al., "The Application of K–Space in Medical Ultrasound", IEEE Ultrasonics Symposium, pp 1379–1383, (1995).

(List continued on next page.)

*Primary Examiner*—Ali M. Imam
(74) *Attorney, Agent, or Firm*—Robert J. Decker

(57) ABSTRACT

The angular imaging system, and related method utilizes translating apertures to acquire data at a number of angles of interrogation. For omnidirectional scatterers, that is scatterers which emit a uniform sound field in all directions when insonified, the translating apertures should theoretically yield identical speckle patterns at all angles of interrogation. The result is in strong contrast to previously applied convention angular scatter measurement methods which produced rapidly varying speckle patterns with interrogation angle. Thus by using the translating apertures, using the transmit aperture translator (62), and the receive aperture translator (72), it is possible to acquire data for which the only variation in received signal with angle is due to the intrinsic scattering of the target.

36 Claims, 16 Drawing Sheets

OTHER PUBLICATIONS

Robinson, Marshal T., et al., "Real–Time Angular Scatter Imaging System for Improved Tissue Contrast in Diagnostic Ultrasound Images", IEEE Transactions on Ultrasonics and Frequency Control, vol. 41, No. 1, Jan. (1994).

Jensen, J., et al., "Calculation of Pressure Fields from Arbitrarily Shaped, Apodized, and Excited Ultrasound Transducers", IEEE Transactions on Ultrasonics, Ferroelectrics, and Frequency Control, vol. 39, No. 2, Mar. (1992).

Linzer, M., et al., "Phase Aberration Corrections and Algorithm Using Near–Field Signal Redundancy Method: Algorithm", Ultrasonic Imaging, vol. 17, 45–65, (1995).

Walker, W.F., et al., "Speckle Coherence and implications for adaptive imaging", J. Acoust. Soc. Am., Vol 101, No. 4, Apr., (1994).

Ng, Gary, et al., "A Speckle Target Adaptive Imaging Technique in the Presence of Distributed Aberrations", IEEE Transactions on Ultrasonics, Ferroelectrics, and Frequency Control, vol. 44, No. 1, Jan., (1997).

Campbell, J.A., et al., "Measurements of Calf liver ultrasonic differential and total scattering cross sections", J. Acoust. Soc. Am., vol. 45, No. 2, Feb., (1994).

Nassiri, D.K. et al., "The Use of Angular Acoustic Scattering Measurements to Estimate Structural parameters of Human and Animal Tissues", J. Acoust. Soc. Am., vol. 79, No. 6, Jun., (1986).

Davros, W.J., et al., "Frequency–dependent angular scattering of Ultrasound by Tissue–Mimicking materials and Excised tissue", J. Acoust. Soc. Am., vol. 80, No. 1, Jul., (1986).

Rachlin, Daniel, "Direct Estimation of Aberrating Delays in Pulse–echo Imaging Systems", J. Acoust. Soc. Am., vol. 88, No. 1, Jul. (1990).

Lacefield, J.C., "Angular Scatter Ultrasound Imaging using Separated Arrays", Thesis, Duke University, (1999).

* cited by examiner

θ| ANGLE OF INTERROGATION

FIRST TRASMIT APERTURE II & FIRST RECEIVE APERTURE 31
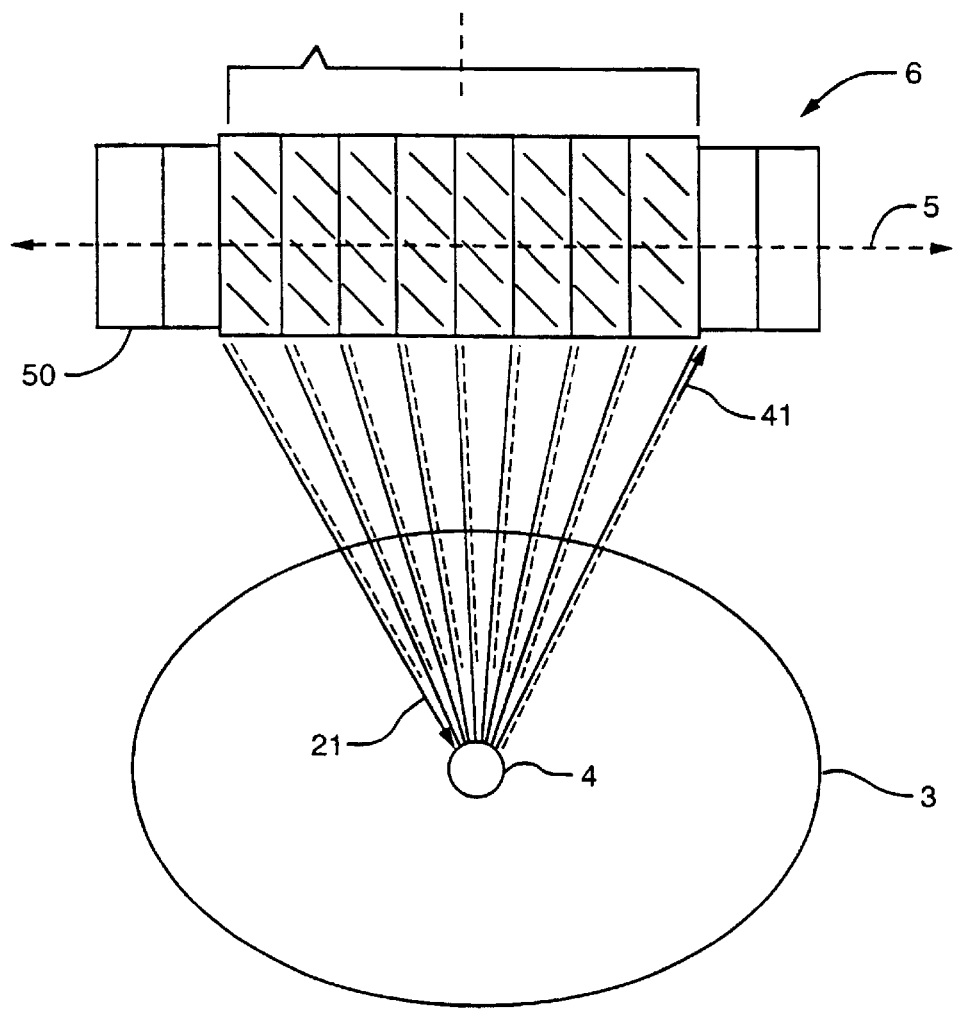
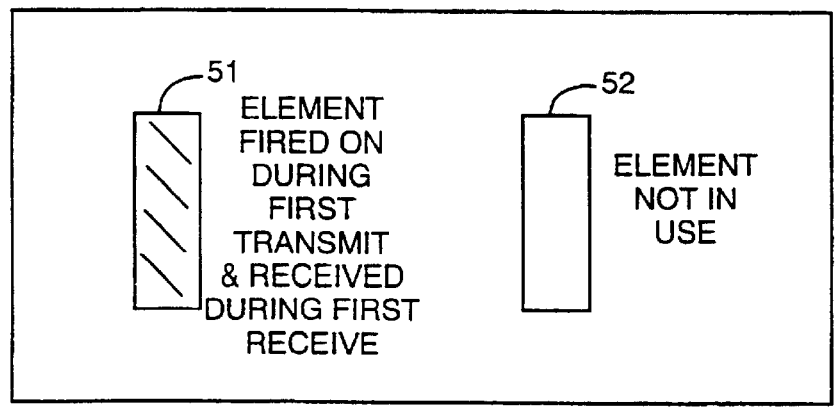
FIG. 3A

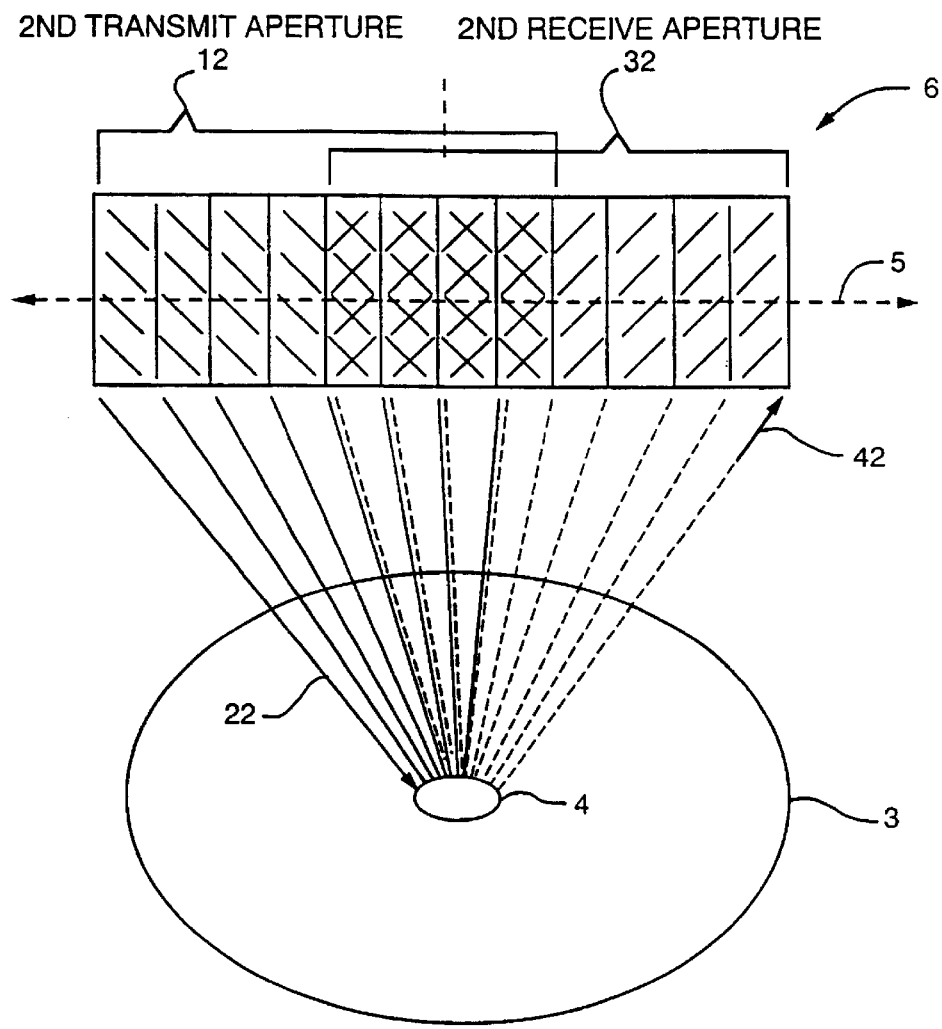
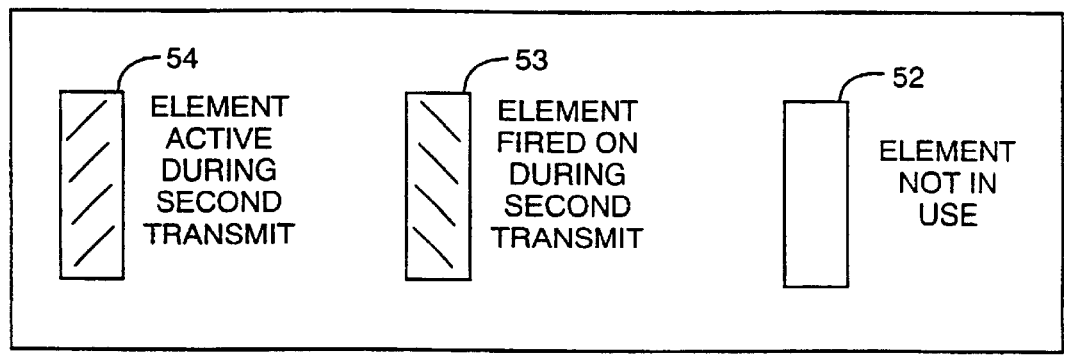
FIG. 3B

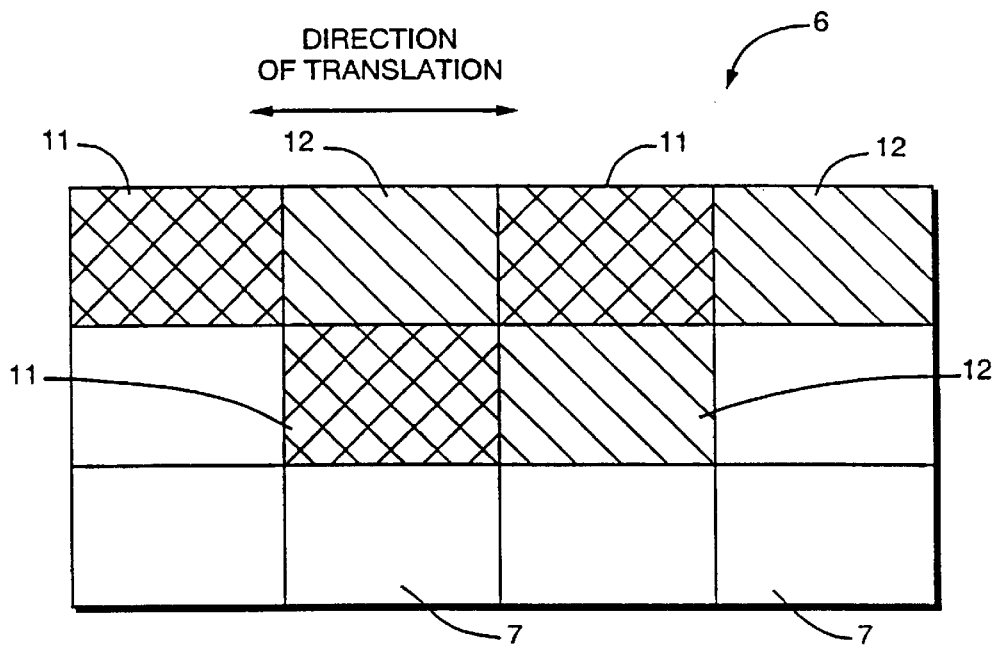
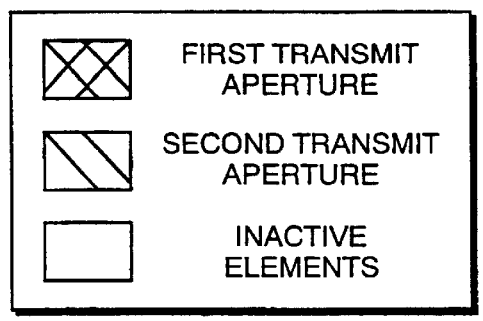
FIG. 8A

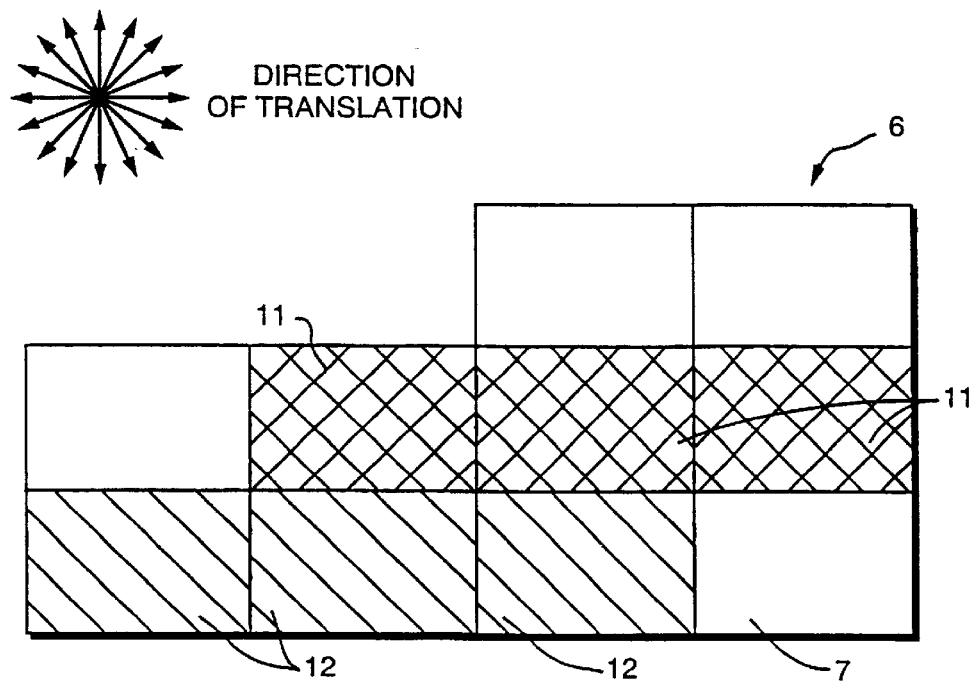
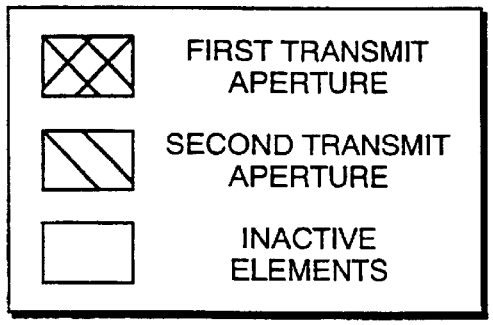
FIG. 8B

FROM 108
FIG. 10

SUBTRACT THE ECHO SIGNALS RECEIVED DURING SUBSEQUENT REPETITION FROM THE ECHO SIGNALS RECEIVED DURING FIRST REPETITION TO PROVIDE DERIVED ECHOES; AND SCALE THE DERIVED ECHOES BY A FACTOR OF ABOUT 1 OR GREATER TO PROVIDE D-WEIGHTED ECHO DATA.
— 110

FOCUS AND SUM THE D-WEIGHTED ECHO DATA; AND DISPLAY THE FOCUSED AND SUMMED DATA TO PROVIDE A D-WEIGHTED ULTRASOUND IMAGE.
— 112

SUBTRACT THE DERIVED ECHOES FROM THE ECHO SIGNALS FIRST RECEIVED DURING FIRST REPETITION TO PROVIDE C-WEIGHTED ECHO DATA
— 114

FOCUS AND SUM THE C-WEIGHTED ECHO DATA; AND DISPLAY THE FOCUSED AND SUMMED C-WEIGHTED DATA TO PROVIDE A C-WEIGHTED ULTRASOUND IMAGE
— 116

ANGULAR SCATTER IMAGING SYSTEM USING TRANSLATING APERTURES AND METHOD THEREOF

CROSS-REFERENCES TO RELATED APPLICATIONS

This application is a national stage filing of International Application No. PCT/US00/18652, filed Jul. 7, 2000, which claims priority benefit under 35 U.S.C. Section 119(e) from U.S. Provisional Patent Application Serial No. 60/142,556 filed Jul. 7, 1999, entitled "Angular Scatter Imaging Using the Translating Apertures Algorithm," and 60/169,598 filed Dec. 8, 1999, entitled "Angular Scatter Imaging Using the Translating Apertures Algorithm" the entire disclosures of which are hereby incorporated by reference herein.

The present invention is related to Trahey et al. U.S. Pat. No. 5,673,699 entitled "Method and Apparatus for Aberration Correction in the Presence of a Distributed Abberrator" the entire disclosure of which is hereby incorporated by reference herein.

US Government Rights

This invention was made with United States Government support under Grant No. R01-43334, awarded by the National Institute of Health (NIH). The United States Government has certain rights in the invention.

FIELD OF THE INVENTION

The present invention is directed to a system and method for ultrasound imaging, and particularly imaging angular scatter by coherently processing data from multiple scattering angles using translating apertures.

BACKGROUND OF THE INVENTION

Conventional ultrasound systems transmit pulses of high frequency sound into the body and map the magnitude of returned echoes to form B-mode images. The brightness of these images is a function of many factors including transmit and receive transducer geometry, attenuation and phase aberration in the propagation path, and most importantly, the acoustic scattering of the tissue itself. Conventional systems map the acoustic backscatter from tissue; that is the sound energy returned directly to the transmitter. While such images have great diagnostic value, they represent only a fraction of the information available from the scattered sound field.

One untapped source of information is angular scatter. As the incident wave scatters from tissue structures, different fractions of its energy are scattered in different directions. Angular scatter is described using the geometry shown in FIG. 1. In this nomenclature backscatter is indicated by a scattering angle of 180°, while angular scatter occurs at smaller angles. Although angular scatter information is not utilized clinically, it has been a topic of research for over a decade. Research in this area has consisted of both fundamental measurements and the development of practical imaging systems.

Angular scatter measurements have typically had the goal of measuring the average angular scatter over a large area, at a single frequency as discussed by W. J. Davros, J. A. Zagzebski, and E. L. Madsen, in *Frequency-dependent angular scattering of ultrasound by tissue-mimicking materials and excised tissue*, Journal of the Acoustical Society of America, vol. 80, pp. 229–237, 1986, and by J. A. Campbell and R. C. Waag, in *Measurements of calf liver ultrasonic differential and total scattering cross sections*, J. Acoust. Soc. Am., vol. 75, pp. 603–611, 1984, the entire disclosures of which are hereby incorporated by reference herein. These systems moved piston transducers mechanically around a target to interrogate different scattering angles. However, for reasons described below, these measurements exhibited large statistical fluctuations and therefore required significant averaging to yield reliable results. Thus, while these measurements lend insight into tissue scattering, their methods cannot be adapted for clinical imaging.

Previous angular scatter imaging systems have had the goal of imaging tissue at a single scattering angle other than 180° as discussed by M. T. Robinson and O. T. V. Ramm, in *Real-Time Angular Scatter Imaging System for Improved Tissue Contrast in Diagnostic Ultrasound Images*, IEEE Transactions on Ultrasonics, Ferroelectrics, and Frequency Control, vol. 41, 1994, and by J. C. Lacefield, in *Angular Scatter Ultrasound Imaging using Separated Arrays*, Duke University, 1999 the entire disclosures of which are hereby incorporated by reference herein. These systems have used one or more phased array transducers with the transmit aperture displaced physically from the receive aperture. By applying electronic focusing and beam steering, these systems were able to interrogate a 2-D region at high spatial resolution and with broad bandwidth. Angular scatter images were displayed beside accompanying B-mode images, however direct comparison was difficult because each image presented a different speckle pattern. While these systems have yielded interesting results, they do not coherently process data acquired at different scattering angles, and thus fail to make full use of angular scatter information.

FIGS. 15(A)–(D) illustrate k-space representations of a variety of angular scatter measurement/imaging geometries (k-space will be discussed in greater detail below). For introduction purposes, FIG. 15(A) indicates a simple backscatter geometry. The incident wave vector is indicated by "i," the observed wave vector by "o," and the k-vector by "k." The gray oval indicates the region of k-space interrogated by this system. This region is narrow in the axial spatial frequency dimension to indicate a narrow bandwidth. The lateral spatial frequency dimension is also narrow, indicating poor lateral spatial resolution.

FIG. 15(B) depicts the geometry used by Davros et al, as discussed above. The dark oval indicates the region of k-space interrogated by this system while the light oval is the backscatter system. Note the lack of overlap and thus lack of speckle coherence between the backscatter and angular scatter interrogation.

FIG. 15(C) indicates the k-space representation of the angular scatter system used by Campbell and Waag, as discussed above. The rotation of Davros is eliminated by rotating the transmitter and receiver by equal and opposite increments circumferentially. However, the downshift of the axial spatial frequencies has still eliminated any speckle coherence for this narrowband system.

There is therefore a need in the art for an effective system and method for ultrasound imaging. In particular, imaging angular scatter by coherently processing data from multiple scattering angles while still having stability in the speckle pattern with angle that allows direct comparison of echoes acquired at different scattering angles using a translating aperture.

Accordingly, FIG. 15(D) depicts the k-space representation of the translating apertures implemented on a broadband phased array system of the present invention. The broad bandwidth of this system ensures that some speckle coherence is maintained, even with the downshift in axial spatial frequencies.

SUMMARY OF THE INVENTION

According to the invention, a system is provided for imaging a target using imaging angular scattering comprising: a transducer array having a plurality of elements aligned along at least one of a plurality of translational axes wherein the plurality of translational axes are directed horizontally, vertically, and/or diagonally relative to the target; a transmitter for generating and transmitting ultrasound pulses at the target operably associated with the transducer array; a transmit aperture translator electrically associated with the transmitter for transmitting pulses to fire from the elements of the transducer array thereby defining a subject transmit aperture, wherein the subject transmit aperture comprises at least two preselected the elements; a receiver for receiving echoes of transmitted pulses operably associated with the transducer array and outputting echo signals therefrom; a receive aperture translator electrically associated with the receiver and for receiving pulses transmitted from the subject transmit aperture and received at the elements of the transducer array thereby defining a subject receive aperture, wherein the subject receive aperture comprises at least two preselected the elements; a controller for controlling the transmit aperture translator and the receive aperture translator wherein the transmission and reception are iteratively performed at least twice, wherein after each of the iterations of transmission and reception the subject transmit aperture and the subject receive aperture are translated along one of the plurality translation axes in a predetermined equal and opposite direction relative to one another; and a signal processor operably associated with the receiver, the signal processor adapted to receive the echo signals and perform angular scatter analysis on the echo signals after each of the second or subsequent iterations so as to provide an image signal representative of the target.

Further, the invention provides a translating apertures method of imaging a target comprising the steps of: a) providing a transducer array having a plurality of elements aligned along at least one of a plurality of translational axes wherein the plurality of translational axes are directed horizontally, vertically, and/or diagonally relative to the target; b) generating a subject ultrasound pulse at preselected elements of the plurality of elements to define a subject transmit aperture; c) focusing the subject ultrasound pulse to a predetermined point on the target; d) transmitting the subject ultrasound pulse from the subject transmit aperture to the target point; e) receiving echoes of the transmitted pulses at preselected elements of the plurality of elements to define a subject receive aperture; f) outputting echo signals received from the receive aperture; g) repeating step "a" through step "f" at least one or more times, wherein after each repetition the method further comprises the additional step of: translating the subject transmit aperture and the subject receive aperture along one of the plurality of translation axes in a predetermined equal and opposite direction relative to one another; and h) processing the echo signals to perform angular scatter analysis on the echo signals after the first or subsequent repetitions so as to provide an image signal representative of the target.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings in which:

FIG. 3(A) is a schematic representation of the present invention transducer array defining first transmit and first receive apertures.

FIG. 3(B) is the a schematic representation of the transducer array of FIG. 3(A) defining second transmit and second receive apertures.

FIGS. 8(A)–(B) are exemplary, schematic, illustrations of alternative transmit aperture geometries of the present invention.

FIG. 11 provides an algorithm of a preferred embodiment of the present invention pertaining to the angular scatter analysis provided at step 108 of FIG. 10

DETAILED DESCRIPTION OF THE INVENTION

Figure 1:
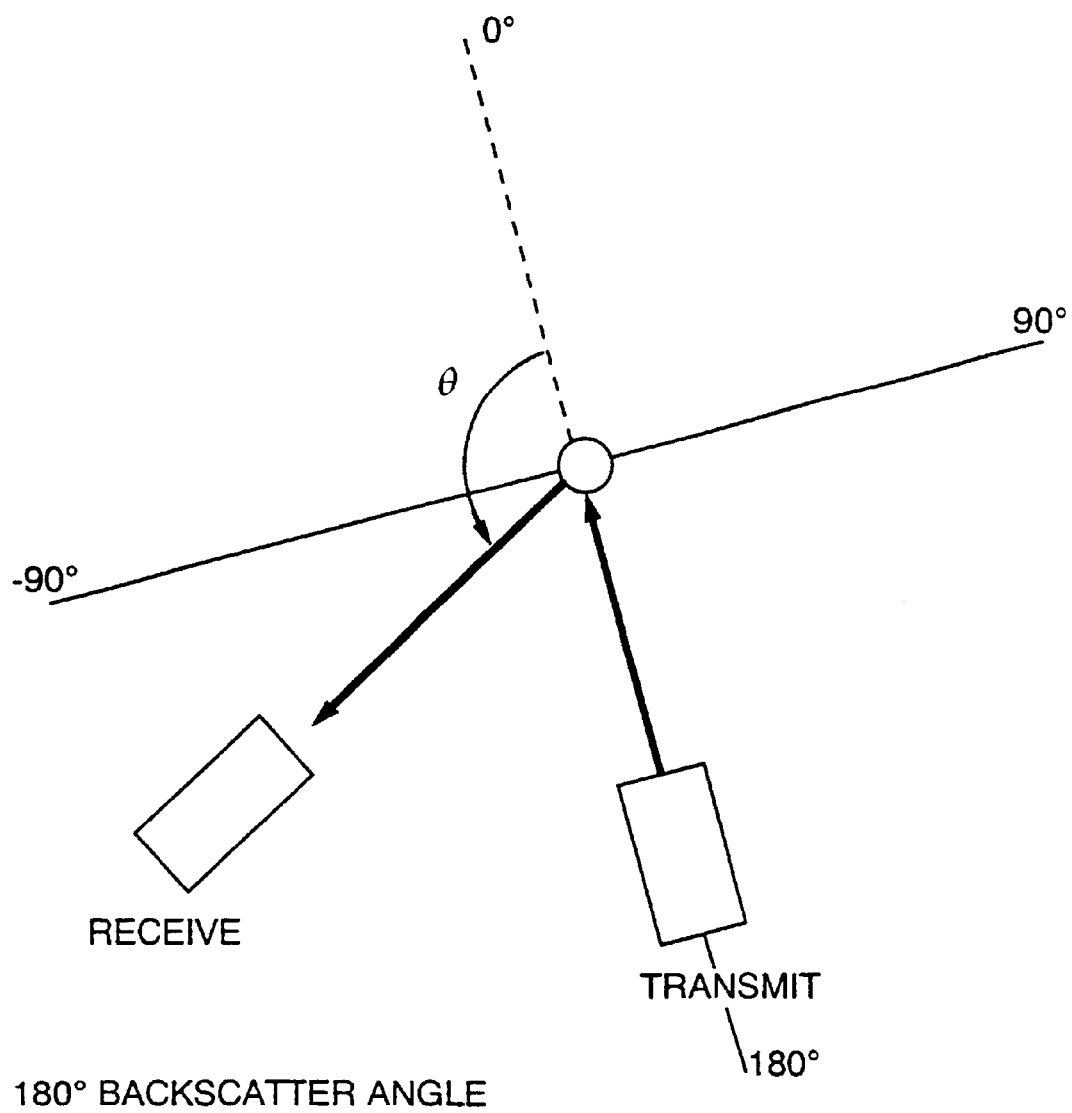
FIG. 1 provides a graphical representation of angular scattering, wherein backscatter is indicated by a scattering angle of 180°.

The present invention provides an imaging system and method thereof for imaging angular scatter that coherently processes data from multiple scattering angles. The present invention utilizes translating apertures to acquire data at two or more scattering angles and then processes this data to form images depicting angular scatter information. A preferred embodiment of the present invention would use echoes from two angles to form separate images of the common scattering with angle and the differential scattering with angle. Use of the translating apertures imposes a stability in the speckle pattern with angle that allows direct comparison of echoes acquired at different scattering angles. This approach is intended for implementation in broadband phased array imaging systems.

For purposes of illustration, a translating aperture was described by Trahey et al. U.S. Pat. No. 5,673,699 entitled "Method and Apparatus for Aberration Correction in the Presence of a Distributed Abberrator" and discussed by co-inventors W. F. Walker and G. E. Trahey, in *Speckle Coherence and Implications for Adaptive Imaging*, Journal of the Acoustical Society of America, vol. 101, pp. 1847–1858, 1997 (herein after "Speckle Coherence" article), the entire disclosures of which are hereby incorporated by reference herein. The Trahey U.S. Pat. No. 5,673,699 translating angular aperture was developed as a method to improve phase aberration correction performance.

Another example of a translating aperture for the correction of phase aberration is described by G. C. Ng, P. D. Freiburger, W. F. Walker, and G. E. Trahey, in *A speckle target adaptive imaging technique in the presence of distributed aberrations*, IEEE Trans. Ultrason. Ferroelec. Freq. Contr., vol. 44, pp. 140–151, 1997, (hereinafter "Speckle Target Adaptive" article).

Similarly, another type of phase aberration correction method is proposed by D. Rachlin in U.S. Pat. No. 5,268,876, entitled *Method of Estimating Near Field Aberrating Delays*, and in *Direct estimation of aberrating delays in pulse-echo imaging systems*, JASA, vol. 88, pp. 191–198, 1990 (the entire disclosures of which are hereby incorporated by reference herein) describes transmitting single pulses from each of a number of individual transmitting elements. Each transmit element is paired with a receive element such that each transmit/receive pair shares a common midpoint. Receive echoes are then correlated to estimate time delays which are in turn processed using a matrix formulation to estimate an aberration profile.

Y. Li also proposes a phase aberration correction technique in Li et al. U.S. Pat. No. 5,566,675, entitled *Beamformer for Phase Aberration Correction and as discussed in Phase Aberration Corrections and in Algorithm Using Near-Field Signal Redundancy Method: Algorithm*, in Twentieth International Symposium on Ultrasonic Imaging and Tissue Characterization, vol. Ultrasonic Imaging 17, M. Linzer, Ed. Rosslyn, Va., 1995, pp. 64 (the entire disclosures of which are hereby incorporated by reference herein). Li, like Rachlin, acquires data using common midpoint transmit/receive element pairs and combines delay estimates using a matrix formulation. Like Rachin, Li generates each transmit pulse from a single transmit element without focusing or steering. However, instead of using a single array element, the present invention provides a large focused aperture. As such, the use of a large aperture in the present invention will improve the electronic signal to noise ratio (SNR) and increases correlation between received signals by restricting the area of tissue insonified.

Figure 2D:
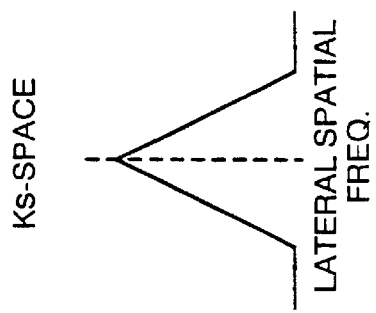
FIGS. 2(A)–(D) are schematic representations of the present invention translating apertures and corresponding ks-space representation
Figure 2C:
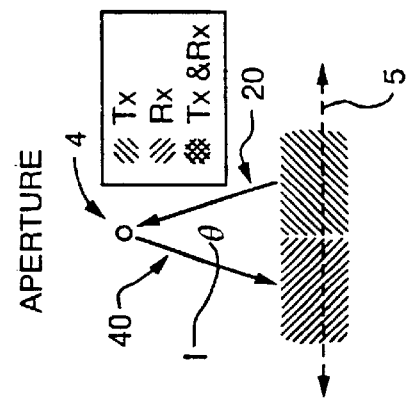
Figure 2B:
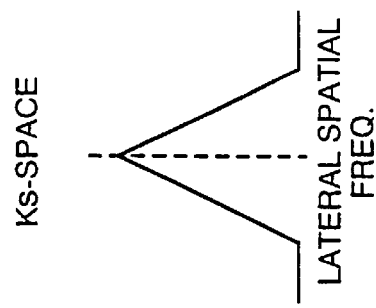
Figure 2A:
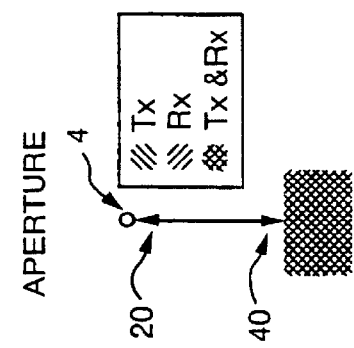
Figure 4A:
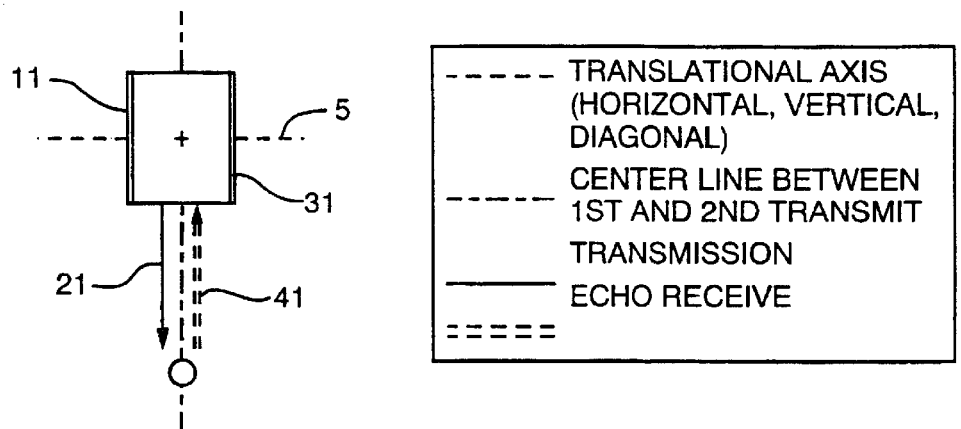
FIGS. 4(A)–7(B) are exemplary, schematic, illustrations of alternative transmit and receive aperture geometric configurations of the present invention.
Figure 4B:
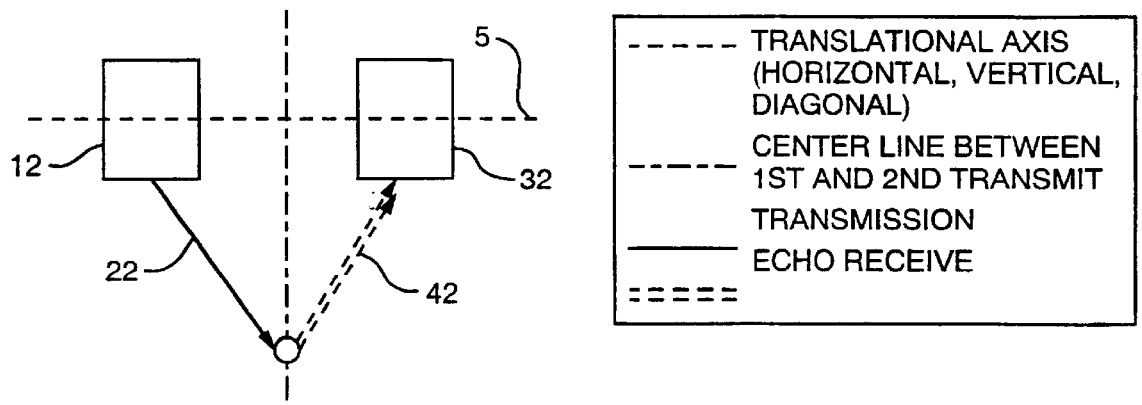
Figure 5A:
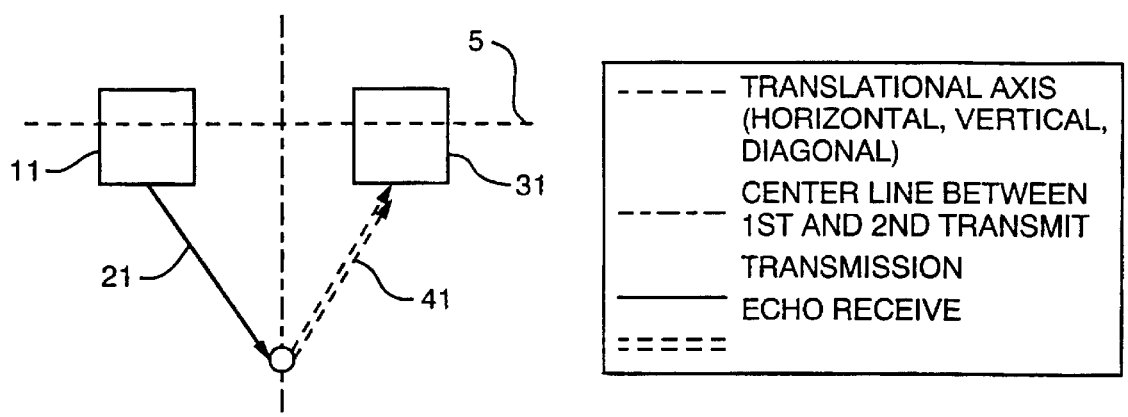
Figure 5B:
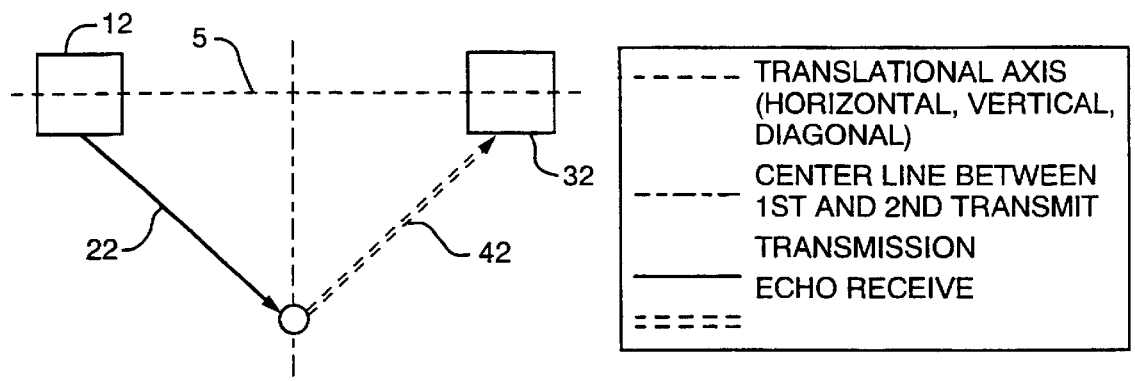
Figure 6A:
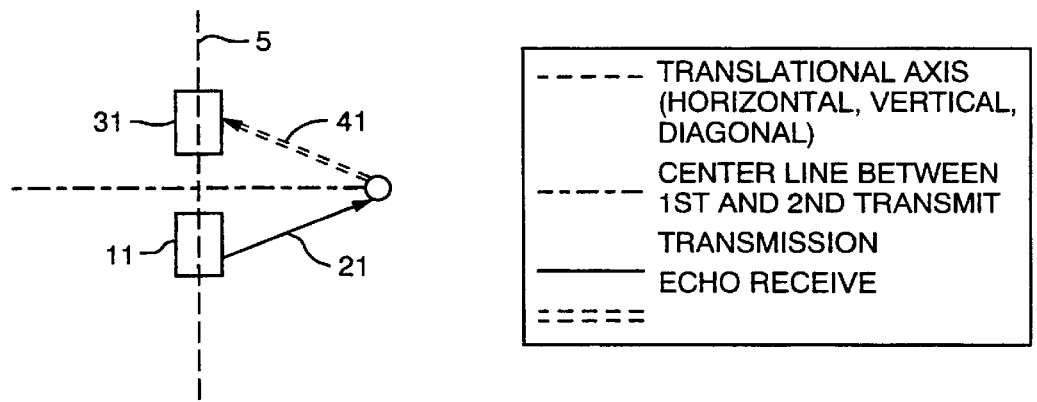
Figure 6B:
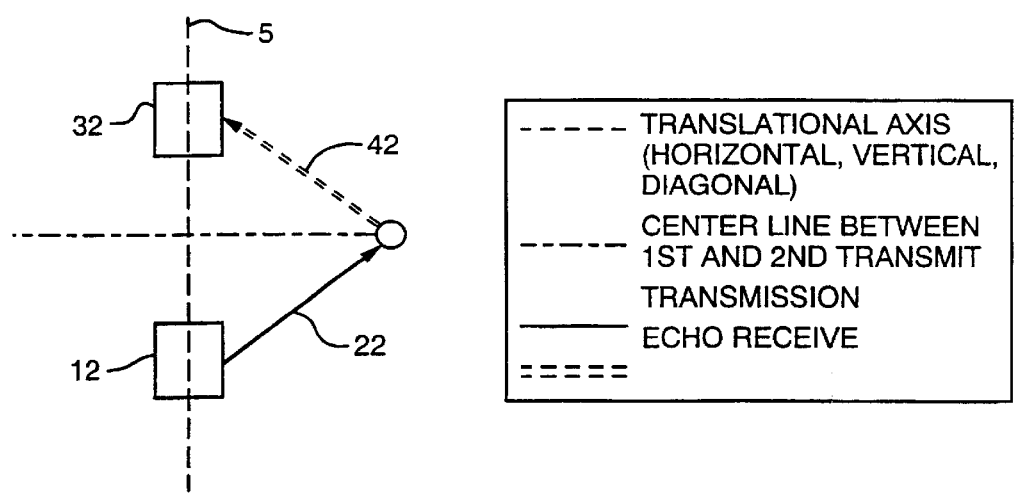
Figure 7A:
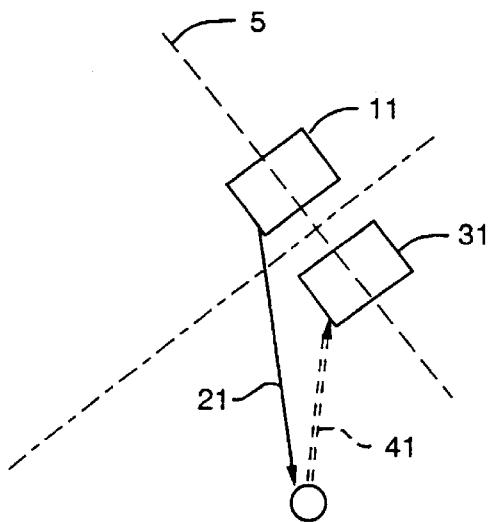
Figure 7B:
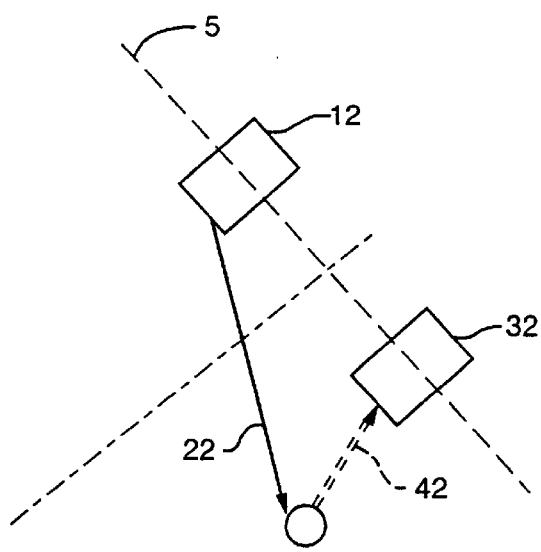

Referring to FIGS. 2(A)–(D), as a simplified illustration of one of the functions of the present invention, an initial set of echo data is acquired with a transmitter aperture 10 and a receiver aperture 20 located in the same physical space, both steered straight ahead, as shown in FIG. 2(A). A second set of echo data is then acquired with the transmit aperture 10 and receive aperture 20 displaced by equal amounts in opposite directions along the translational axis 5, as shown in FIG. 2(C). Note that both arrays remain steered and focused on the original target point 4. It is intended that the transmitter and receiver apertures 10, 20 be implemented with a phased array, such as a transducer array 6 so that all steering, focusing, and aperture translation can be performed electronically, i.e. spatially and temporally. Assuming omnidirectional scattering from the target point 4, the two sets of echoes acquired by the receiver aperture 20 will be nearly identical, at least near the focus. FIG. 2(C) also discloses the angle of interrogation as depicted by θ which is defined by the angle formed between the transmit pulse 20 and the receive pulse 30.

Further, for purposes of simplicity an aspect of the present invention can be illustrated in "k-space", which is a frequency domain description of imaging systems and targets as described by the co-inventors W. F. Walker and G. E. Trahey, in *The Application of K-Space in Medical Ultrasound*, IEEE Transactions on Ultrasonics, Ferroelectrics, and Frequency Control, vol. 45, pp. 541–558, 1998, the entire disclosure of which is hereby incorporated by reference herein. For clarity we will consider a simplified version of k-space, $k_s$-space. Although the $k_s$-space representation of an imaging system neglects some subtle effects described in a full k-space representation, it is a good first order analysis. The $k_s$-space representation of an imaging system is equal to the convolution of a scaled and reversed version of the transmit aperture with a scaled and reversed version of the receive aperture. Thus, for a transmit-receive imaging system 1 with uniformly weighted apertures of the same size, the $k_s$-space representation is a triangle function, as shown in FIG. 2(B). If both apertures are moved in the same direction, or if only one is moved, the triangle function will be shifted to the side. However, if the two apertures are shifted in equal and opposite directions, the triangle function will remain at the same location, as shown in FIG. 2(D). Thus, by shifting the transmit and receive apertures in equal and opposite directions it is possible to interrogate tissue at multiple angles without changing the $k_s$-space representation. Since the $k_s$-space representation is a Fourier Transform of the point spread function (psf), the two imaging geometries will also have identical psfs. For omnidirectional scattering environments identical psfs must yield identical speckle patterns. The ability of acquiring nearly identical echoes at multiple angles has been tested and supported by theory, simulation, and experiment as describe in the aforementioned "Speckle Coherence" and "Speckle Target Adaptive" articles.

For further explanation, the present invention can also be understood by considering the system point spread function (psf). At the focus or in the far-field of an imaging system the one-way psf is simply a Fourier Transform of the aperture. Thus, the psf for a system with a uniform rectangular aperture is a $sinc^2$ function. If the aperture is shifted laterally then the shift theorem of Fourier Transforms states that the psf will acquire a linear phase tilt with slope proportional to the shift. The round trip psf is found by taking the product of the transmit and receive psfs. Thus, the psf for an aperture which is centered in space will be a $sinc^2$ function. If both conventional transmit and receive apertures are shifted in the same direction then the psf will have a linear phase tilt with twice that expected if only one aperture were shifted. However, if the apertures are shifted in equal and opposite directions, as in the present invention, then the phase tilts from each one-way psf will cancel and the resultant two-way psf will have no phase tilt.

Turning now to FIG. 3(A), a transducer array 6 transmits a first transmit pulse 21 for each plurality of elements 7 which is focused and fired from a first transmit aperture 11 to the location 4 on the target 3 (as depicted by the solid lines). Thereafter, a responsive mode is provided for receiving the echoes of the pulses transmitted during the transmission mode. In particular, the transducer array 6 receives a first echo or pulse 41 at the plurality of elements 7 which are active for receiving echoes scattered from the location 4 of the target 3 (as depicted by the broken lines).

Still referring to FIG. 3(A), the elements 51 activated or fired on in the first transmit 11, as well as having received echoes are illustrated here in single backward sloping cross-hatch marks. The elements 51 that are not activated during the pulse and receive sequence are indicated in white.

Referring to FIG. 3(B), a subsequent sequence mode of transmission and reception is effected for the target location 4 discussed above. As such, the transducer array 6 is operated such that the transmit apertures 11, 12 are translated in equal and opposite directions along the translational axis 5 relative to one another in order to obtain the angular scatter results associated with the present invention system 1 as described herein. Accordingly, a second transmit pulse 22 for each element 7 is then focused and fired (as depicted by the solid lines) from a second transmit aperture 12 that is spatially translated or displaced relative to the second receive aperture 32. In particular, the elements 53 fired on in the second transmit aperture 12 are illustrated here in single backward sloping cross-hatch marks. Whereas, the elements 54 activated for receiving the echoes (as depicted by the broken lines) of the second transmit 12 are shown in the second receive aperture 32 and are shown as single forward cross-hatch marks.

FIGS. 4(A) through 7(B) are exemplary illustrations of alternative transmit and receive aperture geometric configurations. There shown for each respective figure is a first (preceding) iteration of transmission-reception of an ultrasound signal (referring to respective A-Figures) and a second (subsequent) iteration of transmission-reception of an ultrasound signal (referring to respective B Figures). One skilled in the art would appreciate that the first and second iterations could be interchanged as well. It should be noted that the translational axis 5 can be oriented at any angle relative to the target location 4. Therefore, in the operating mode of the present invention imaging system it is contemplated that that the translational axis will be oriented in a plurality of orientations to provide a plurality of distinct translational axes.

FIGS. 8A and 8B are exemplary illustrations of alternative transmit aperture geometry. A transducer array 6 having a first aperture 11 of activated elements and a second aperture 12 of activated elements. The legend for the elements is located to the side of the figure. The translation direction is indicated by the arrow. Non-activated elements 7 are indicated in white. Of course, these alternatives are merely examples of translating transmit apertures and the invention is not limited thereto.

Figure 9:
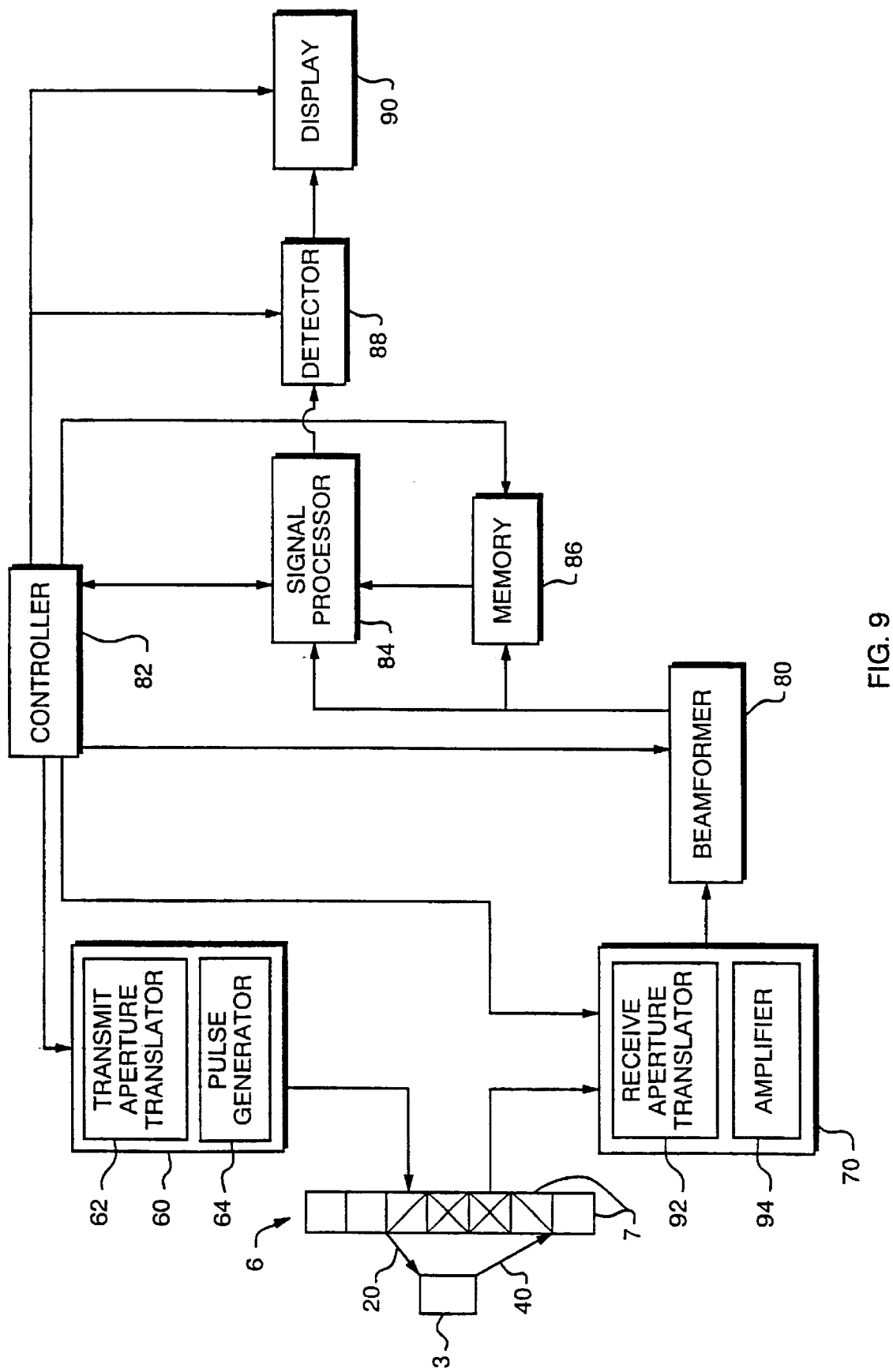
FIG. 9 shows a schematic block diagram of the present invention angular scatter imaging system using translating apertures.

FIG. 9 shows a schematic block diagram of the present invention angular scatter imaging system using translating apertures which includes a transducer array 6 having a plurality of elements 7 that can be operated on a plurality of translational axes as discussed above. A transmitter 60 operably associated with the transducer array 6 is included for generating and transmitting ultrasound pulses 20 at the target 3. The transmitter 60 includes a transmit aperture translator 61 for transmitting pulses to fire from the elements 7 of the transducer array 6 thereby defining a transmit aperture 10, whereby the transmit aperture comprises at least one or more preselected elements 7. Next, a receiver 70 is operably associated with the transducer array 6 for receiving echoes of transmitted pulses 40 and outputting echo signals therefrom. The receiver 70 includes a receive aperture translator 72 for receiving pulses 20 transmitted from the subject transmit aperture 10 and received at the elements 7 of the transducer array 6 thereby defining a subject receive aperture 30, wherein said subject receive aperture comprises at least one or more preselected said elements.

Still referring to FIG. 9, a controller 82 is provided for controlling the transmit aperture translator 62 and the receive aperture translator 72. As such, as a successive transmission and reception mode is iteratively performed at least twice, the controller 62 effects the transmit aperture 10 and receive aperture 309 so as to be translated along one of a plurality of translation axes 5 in a predetermined equal and opposite direction relative to one another, as discussed in detail herein. Thereafter, the translation may occur after each iteration of the transmission-reception mode.

Referring to FIG. 9, a signal processor 84 is operably associated with the receiver 70 whereby the signal processor 84 is adapted to receive the echo signals and perform angular scatter analysis on the echo signals after each of the second or subsequent iterations so as to provide an image signal representative of the target. Also, a beamformer 80 is operably associated with the receiver 30 for compensating for geometric array configurations and target relationships, and for summing echoes from the receive elements. It is contemplated that the beamformer 80 can be adapted so as to provide an output to the signal processor 84, or alternatively to receive an output from the signal processor 84. Finally, a detector 88 is provided to perform envelope detection on the processed signals and output the detected signals to a display or monitor 90, printer device, and/or similar display device.

Figure 10:
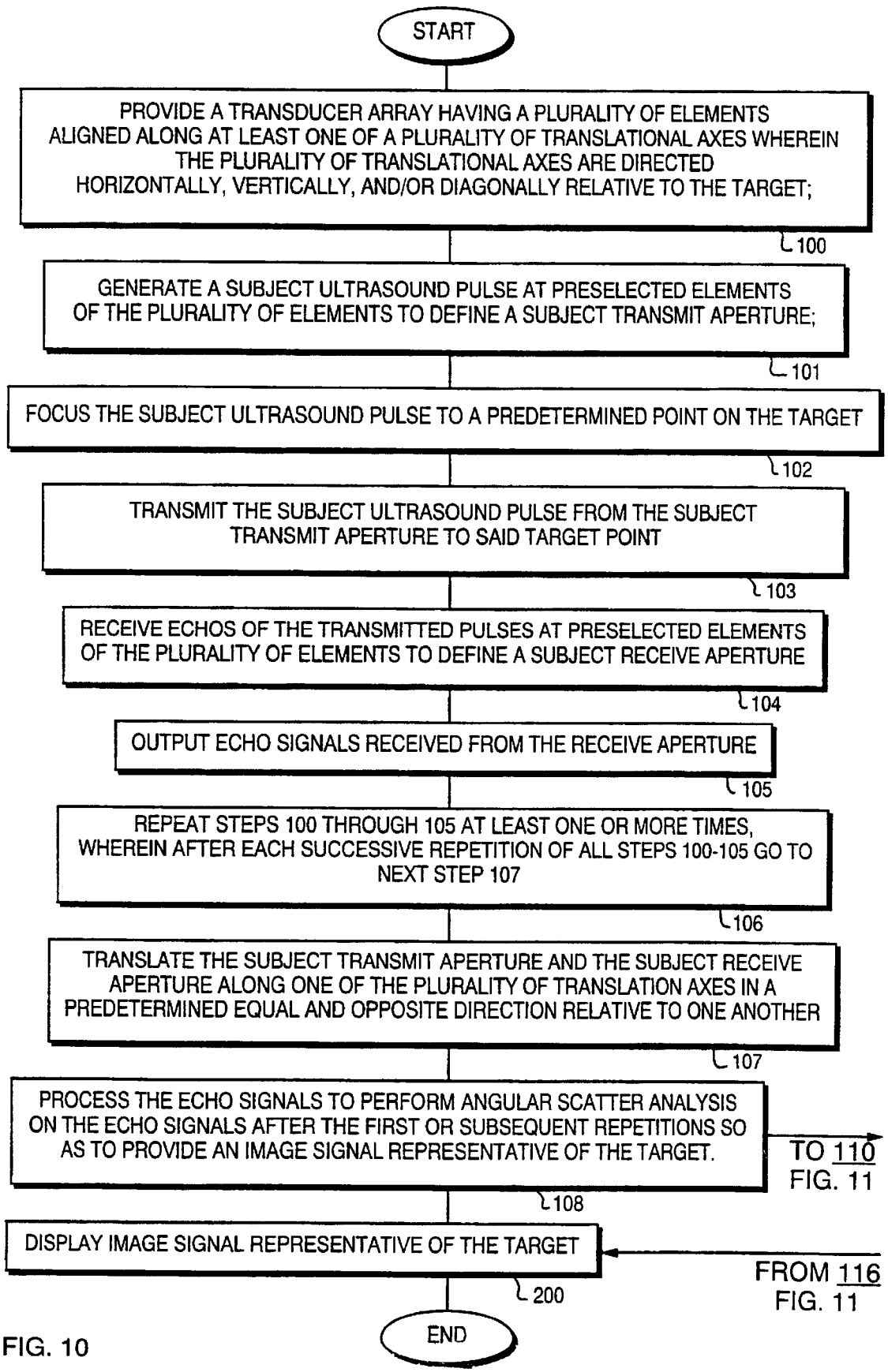
FIG. 10, provides an algorithm for a preferred embodiment of the present invention.

Referring to FIG. 10, an algorithm is provided for a preferred embodiment of the present invention. The algorithm provides steps 100 through 106 for implementing the transmission and reception of the ultrasound echoes. Thereafter, transmit and receive apertures are translated according to step 107. Next, an angular scatter analysis is performed on the echo signals at step 108 so as to provide an image signal representative of the target based on angular scatter according to step 200.

Next, FIG. 11 specifically discloses an algorithm of a preferred embodiment of the present invention pertaining to the angular scatter analysis provided at step 108. In particular, D-weighted and C-weighted data are derived in steps 110–116 for purpose of displaying the respective D-weighted and C-weighted ultrasound images.

It is contemplated that other preferred embodiments of angular scatter analysis will be performed by using a method of processing the echoes other than the c-weighted and d-weighted analysis. As discussed above, the c- and d-weighted imaging processing includes, generally, finding the common (c-) and differential (d-) scattering over two angles of interrogation. Radio Frequency (RF) data can then be found by scaling and subtracting operations.

Moreover, an alternative embodiment of the present invention of processing the echo signals may entail "Correlation Imaging". Correlation imaging essentially calculates the correlation coefficient between echo data acquired from different angles.

Further yet, another alternative embodiment of the present invention of processing the echo signals may entail "Ratio Imaging". Ratio imaging essentially finds the ratio of echoes acquired at different angles. This could be performed on complex demodulated data to simplify computation and reduce the likelihood of errors when the signal drops very low. It might be necessary to limit ratios to a certain range for display to eliminate places where the result is unstable.

For purpose of illustration, the present invention can be set forth in context of FIGS. 2(A) and 2(C) as discussed earlier. In summary, the present invention, translation aperture related algorithm, can be expressed as follows:
1. Acquire echoes using the transducer configuration depicted in FIG. 2a.
2. Acquire echoes using the transducer configuration depicted in FIG. 2c.

3. Subtract echoes acquired in step 2 from those acquired in step 1 and scale the result to extract the echoes resulting from variation in scattering with angle. (See equation 4 below.)
4. Envelope detect and display the data from step 3 to yield an image of differential angular scattering.
5. Process signals from steps 1 and 3 to yield echoes resulting from common angular scattering. (See equation 5 below.)
6. Envelope detect and display the data from step 5 to yield an image of the common angular scattering component.

The image formed in step 4 will highlight the local component of scattering which differs with angle. This is termed the difference-weighted or d-weighted image. The image acquired in step 6 will highlight the local component of scattering which stays constant with angle. This is termed the common-weighted or c-weighted image. C- and d-weighted images will offer information that is unavailable in standard B-mode images.

The illustrative algorithm outlined immediately above offers a general approach for angular scatter imaging, but lacks the specific scaling factors need for implementation. In addition, there has not been any physical insight into the possible sources of contrast in c- and d-weighted images. These issues are addressed herein by considering a scattering model for the tissue. While the true sources of scattering in tissue are undoubtedly very complex, Rayleigh scattering is assumed herein for illustration purposes.

In the instance of Rayleigh scattering, the imaging method described above will yield information about the fundamental material properties of compressibility and density. This can be shown by considering the acoustic field scattered when an ultrasonic plane wave intersects a spherical Rayleigh scatterer. This is predicted analytically using the equation 1 below:

$$P(r, \theta) = A \frac{e^{jkr}}{r} \frac{1}{3} k^2 a^3 \left( \frac{k_e - k}{k} + \frac{3\rho_e - 3\rho}{2\rho_e + \rho} \cos\theta \right) \quad (1)$$

Wherein $P(r,\theta)$ is the scattered complex acoustic wave at a range r from the target and an angle $\theta$ relative to the insonifying direction, A is the amplitude of the incident plane wave, k is the wave number ($k=2\pi/\lambda=2\pi f/c$), a is the radius of the scatterer, $k_e$ and k are the compressibilities of the target and the background respectively, and $\rho_e$ and $\rho$ are the densities of the target and the background respectively. This expression indicates that the echo generated when a plane wave impinges on a Rayleigh scatterer is equal to the sum of an omnidirectional or monopolar scattered wave resulting from the variation in the scatterer's compressibility from the background and a dipolar or angle dependent scattered wave resulting from the variation in the scatterer's density from the background. Thus an image of angular scatter variations will depict variations in tissue density, while an image of the uniform angular scatter component will depict compressibility variations. This can be summarized as follows:

common-weighted image=c-weighted image= compressibility-weighted image difference-weighted image=d-weighted image=density-weighted image Rayleigh scattering theory provides a basis for deriving the scaling required in step 3 and mathematical operations required in step 5 of the present invention imaging methods. This derivation does not restrict c- and d-weighted imaging to Rayleigh scatterers, but does force these methods to accurately image compressibility and density variations when Rayleigh scattering dominates. The echo acquired in step 1 can be represented mathematically as follows:

$$i_1 = B(\gamma_k - \gamma_{92}) \quad (2)$$

where $i_1$ is the first received echo, and $$B = A \frac{e^{jkr}}{r} \frac{1}{3} k^2 a^3, \quad \gamma_k = \frac{k_e - k}{k}, \quad \text{and} \quad \gamma_\rho = \frac{3\rho_e - 3\rho}{2\rho_e + \rho}.$$

This expression was derived by substituting a scattering angle of 180° into equation 1. Note that although the above problem is analyzed with a single scatterer, the analysis of multiple scatterers could be performed by the application of superposition. The echo acquired in step 2 is similar, however we now consider a general scattering angle of $\theta$:

$$i_1 = B(\gamma_k + \gamma_\rho \cos\theta) \quad (3)$$

where $i_2$ is the second received echo. From these expressions the density weighted echo desired in step 3 can be derived:

$$i_d = \frac{i_1 - i_2}{-1 - \cos\theta} = \frac{B(\gamma_k - \gamma_\rho) - B(\gamma_k + \gamma_\rho \cos\theta)}{-1 - \cos\theta} = B\gamma_\rho \quad (4)$$

where $i_d$ is the density weighted echo. The compressibility weighted echo of step 5 can also be derived:

$$i_c = i_1 + i_d = B(\gamma_k - \gamma_\rho) + B\gamma_\rho = B\gamma_k \quad (5)$$

where $i_c$ is the compressibility weighted echo. The c- and d-weighted echoes of equations 4 and 5 can be envelope detected to yield c- and d-weighted ultrasound images.

Figure 12:
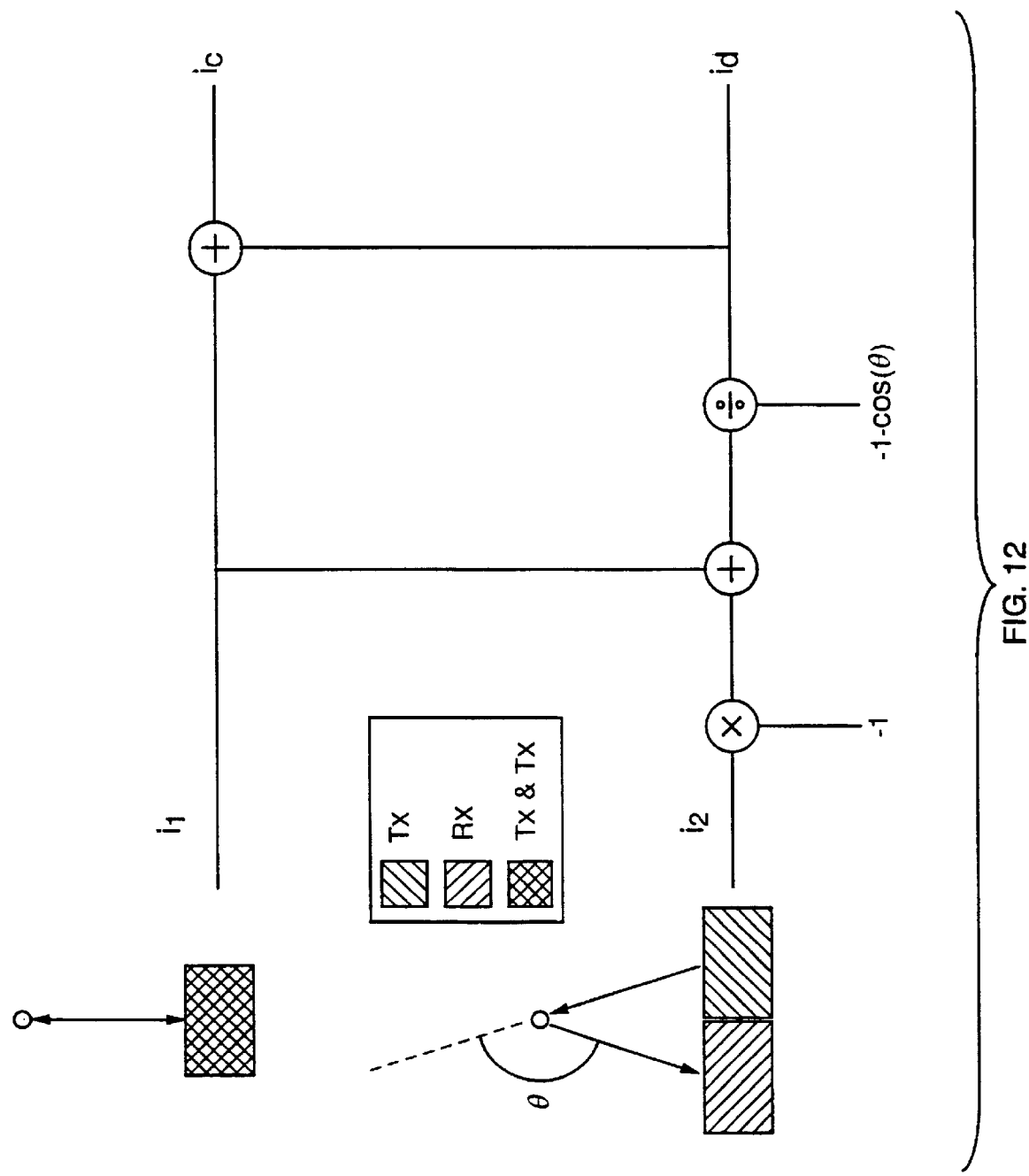
FIG. 12 provides a schematic diagram of the formation of c- and d-weighted images wherein two sets of echo data ($i_1$ and $i_2$) are acquired using the aperture geometries.

Referring to FIG. 12, the process of forming c- and d-weighted images is diagrammed accordingly. On the left side of the figure one set of radio frequency (rf) data is acquired at backscatter and a second set is acquired at a scattering angle of $\theta$. The second set of data is subtracted from the first and the result is scaled to yield d-weighted rf data. This data is added to the backscatter rf data to yield the c-weighted rf data. C- and d-weighted rf data are envelope detected and displayed. The diagram of the formation of c- and d-weighted images using two sets of echo data ($i_1$ and $i_2$) that are acquired using the aperture geometries shown on the left of the figure. In both cases the active apertures are steered and focused on the same target location. The received radio frequency data is processed as shown to yield c- and d-weighted radio frequency data ($i_c$ and $i_d$). This data can be envelope detected and displayed to form images.

EXAMPLE 1

Angular Scatter Imaging of Mircocalcifications and Diffuse Lesions

C- and d-weighted images were simulated to explore their ability to visualize microcalcifications(MCs) and diffuse lesions. Images were formed by processing simulated rf echoes received at scattering angles of 180° and 130°, following the algorithm described above. Received echoes at each angle of interrogation were predicted by adding a signal generated by convolving a compressibility psf with a compressibility target to a signal generated by convolving a density psf with a density target. Image regions corrupted by edge effects were eliminated. Scatterers were placed with sufficient density to ensure the formation of fully developed speckle. The image background was assumed to have a ratio of local density variability to local compressibility variability ($\gamma_\rho/\gamma_\kappa$) of 0.15. This value was chosen based on published data for calf's liver as discussed by D. K. Nassiri and C. R. Hill, in *The Use of Angular Acoustical Scattering Measurements to Estimate Structural Parameters of Human and Animal Tissues*, Journal of the Acoustical Society of America. vol. 79, pp. 2048–2054, 1986, the entire disclosure of which is hereby incorporated by reference herein. The simulated targets included a diffuse positive contrast density lesion, a MC, and a diffuse negative contrast density lesion. The MC was modelled as a single point scatterer with ($\gamma_\rho/\gamma_\kappa$) of –0.91. This value was generated from published data for calcium hydroxyapatite, the major component of MCs. Diffuse lesions are arbitrary and were generated to illustrate the potential of c- and d-weighted images to offer information unavailable in B-mode images.

The density and compressibility scatterers were generated to be statistically independent of each other. It seems likely that any real tissue structure which differs in compressibility from the background will also differ in density, and vice versa. If so, some correlation between the density and compressibility scattering functions would be expected. By assuming no correlation, we consider a scenario where there is no common information in the c- and d-weighted speckle patterns.

Point spread functions for compressibility and density targets at scattering angles of 180° and 130° were predicted using a new simulation tool called PSF as discussed by M. J. McAllister and W. F. Walker, in PSF: *A New Ultrasound Simulation Tool*, IEEE Transactions on Ultrasonics, Ferroelectrics, and Frequency Control, in preparation. This PSF tool models transmit and receive apertures as collections of point sources and receivers. These elements can exhibit either omnidirectional or dipolar sensitivity patterns depending upon whether a hard or soft baffle is assumed. Unlike current tools, such as FIELD, as described by J. A. Jensen and N. B. Svendsen, in *Calculation of pressure fields from arbitrarily shaped, apodized, and excited ultrasound transducers*, IEEE Transactions on Ultrasonics, Ferroelectrics, and Frequency Control, vol. 39, pp. 262–267, 1992, the entire disclosure of which is hereby incorporated by reference herein, targets can exhibit either omnidirectional or dipolar radiation patterns depending upon whether compressibility or density targets are modelled. Point spread functions are found by superimposing waveforms from all permutations of transmitters and receivers assuming spherically spreading, broadband acoustic waves. Since PSF models the transducers as collections of points, it accounts for variations in the interrogation angle which occur across the aperture face.

Point spread functions were modelled for 1.0 cm diameter piston transducers focused at 4.0 cm. Transmitted pulses had a 50% Gaussian bandwidth centered at 10 MHz. Transducer apertures were modelled as collections of approximately 128 point sources/receivers separated by roughly half a wavelength. Frequency compensation, a technique described below, was employed to improve psf uniformity with angle of interrogation. Each psf was simulated over a window extending 1.0 mm axially by 2.0 mm laterally, with 20 $\mu$m sampling.

Figure 13A:
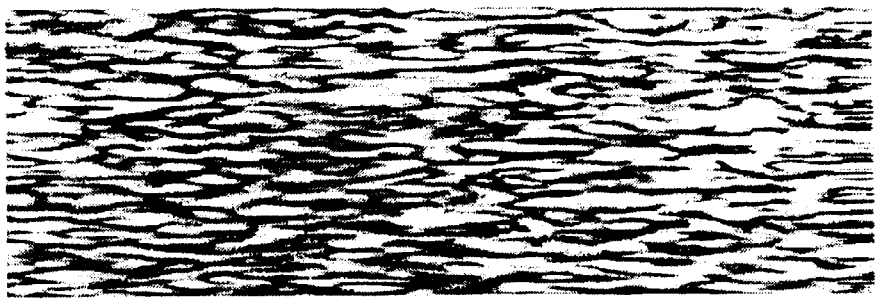
FIGS. 13(A)–(C) illustrate simulated B-mode, c-weighted, and d-weighted images, respectively.
Figure 13B:
Figure 13C:

FIGS. 13(A)–(C) clearly shows the potential of c- and d-weighted imaging. Referring to FIG. 13(A) the B-mode image, which corresponds to a conventional image, fails to depict either the diffuse lesions or the MC.

Whereas, regarding the present invention, referring to FIG. 13(B) the c-weighted image depicts one lesion (left side of figure) marginally and fails to depict either the other diffuse lesion or the MC.

Finally, regarding the present invention, referring to FIG. 13(C) the d-weighted image depicts the first lesion (left side of figure) as well as the MC (center of figure) and an additional diffuse lesion (right side of figure).

As shown by FIG. 13, the relative increase in MC contrast in the d-weighted image of the present invention was enough to make that target detectable. Note that all images in FIG. 13 were brightened to increase the visibility of the negative contrast lesion in the d-weighted image.

EXAMPLE 2

Comparing PDFs for MC Detectablity

As FIG. 13 represents a single realization of an ensemble of images which could be formed of a set of targets. In each realization of this ensemble, the speckle pattern would change, possible obscuring the MC. Accordingly, one skilled in the art would appreciate that there exists a probability density function (pdf) of MC brightness which can be compared to that of background speckle to estimate detectability. Total overlap of the two pdfs would indicate that MC detection was impossible, while no overlap would allow for MC detectability. In this subject example, 10,000 images were simulated to determine the improvement in MC detectability which might be expected in d-weighted images provided by the present invention system and method.

Figure 14A:
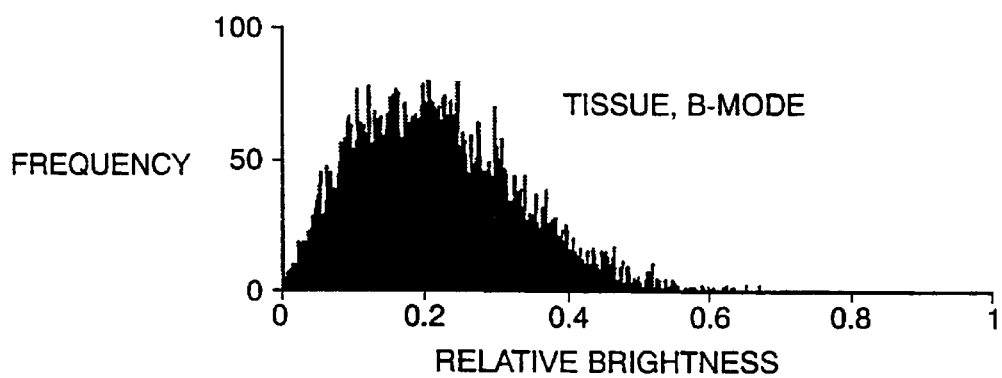
FIGS. 14(A)–(D) illustrate probability density functions for speckle targets and a microcalcification in speckle background imaged by standard B-mode and present invention d-weighted imaging systems.
Figure 14B:
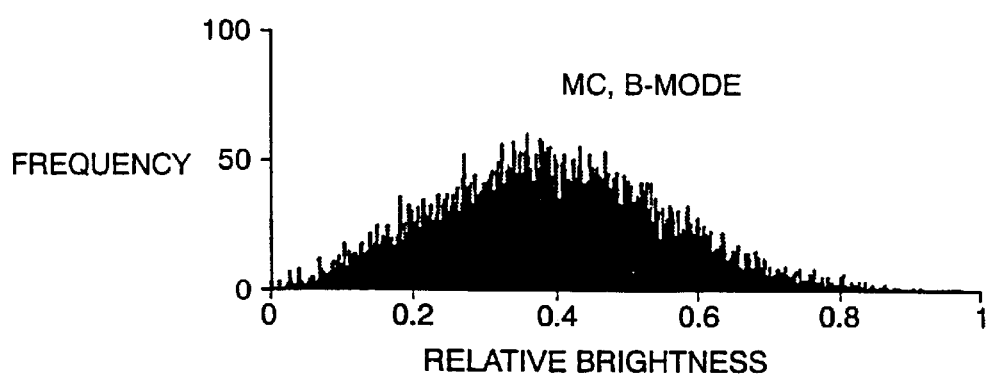
Figure 14C:
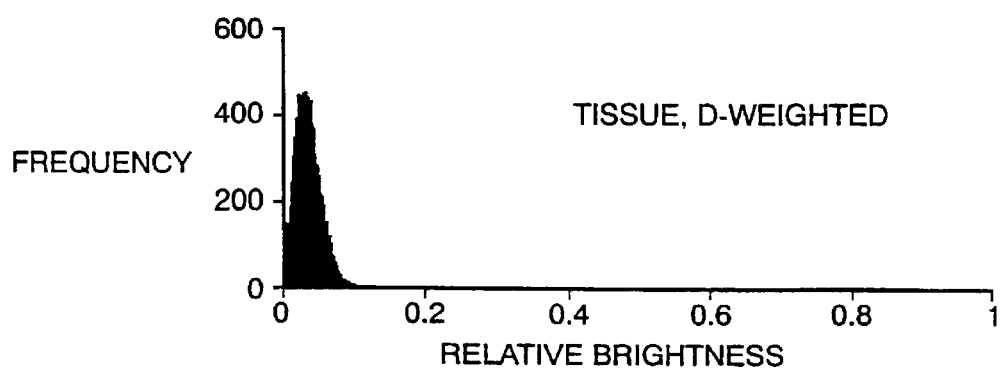
Figure 14D:
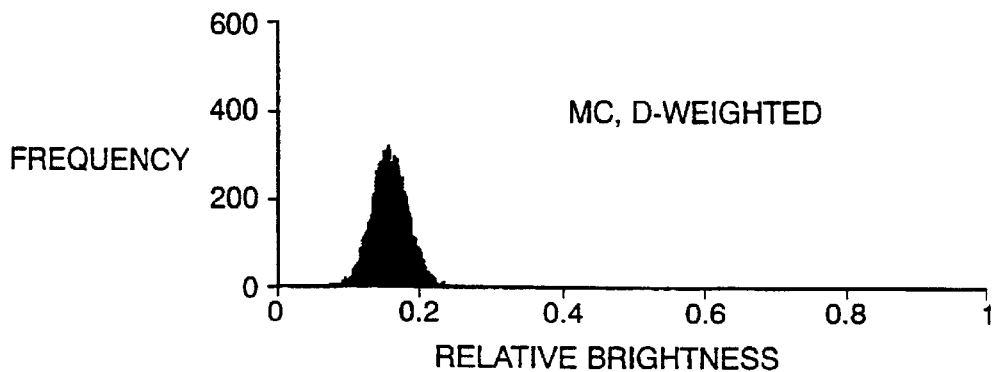
Figure 15A:
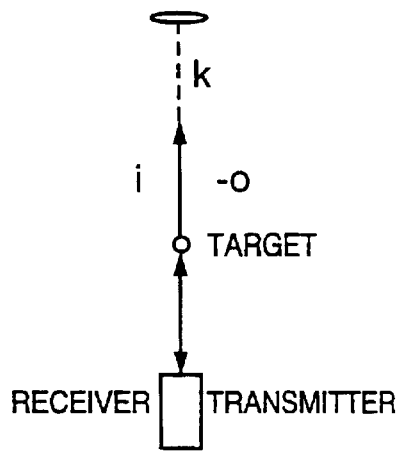
FIGS. 15(A)–(D) illustrate K-space representations of a variety of angular scatter measurement/imaging geometries.
Figure 15B:
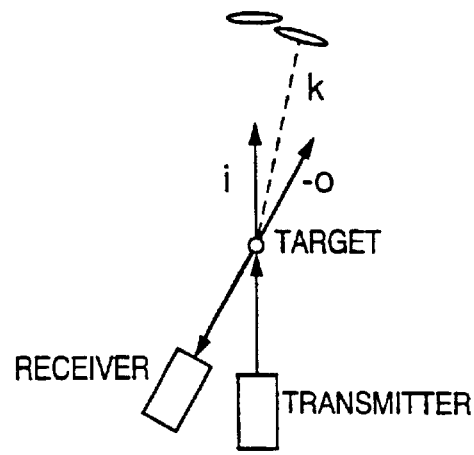
Figure 15C:
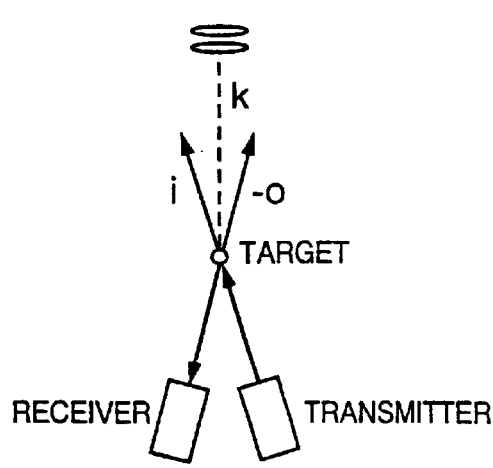
Figure 15D:
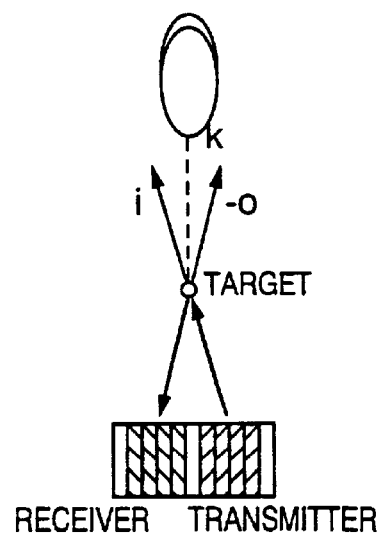

Accordingly, referring to FIGS. 14(A)–(D) the simulated pdfs are shown comparing B-mode to d-weighted. As indicated by the graph of FIGS. 14(A) and(B) the B-mode pdfs show significant overlap between the tissue pdfs and MC pdfs, respectively. Whereas, the d-weighted pdfs of the present invention show almost no overlap, as depicted by the graphs in FIGS. 14(C) and (D). This analysis predicts that MCs will be easier to detect in d-weighted images than they are in B-mode images.

Variations of the present invention are contemplated. For example, the present invention angular scattering system and method may have applications beyond biological materials. One skilled in the art would appreciate that the present invention can be applied to various mediums such as natural materials (e.g., rocks) or artificial or manmade materials. One application may be for performing non-destructive evaluations (NDEs) on various compositions, materials, or mechanical structures.

Another variation of the present invention utilizes matrix methods such as those outlined in Haider et al. U.S. Pat. No. 6,063,033, entitled *Ultrasound Imaging With Higher-order Nonlinearities*, the entire disclosure of which is hereby incorporated by reference herein. As such, the present invention would display such matrix results to indicate angular scatter information.

Accordingly, the present invention angular scatter imaging system and method thereof provides numerous advantages. First, the present invention provides an effective ultrasound system by imaging angular scatter by coherently processing data from multiple scattering angles while still having stability in the speckle pattern with angle that allows direct comparison of echoes acquired at different scattering angles using a translating aperture.

Another advantage of the present invention is the applications of c- and d-weighted imaging in soft tissues. The techniques of the present invention are valuable for detecting calcification in soft tissues. An example of a clinical application would be in breast imaging. Breast cancer screening is currently performed by x-ray mammography, with ultrasonic imaging filling an adjunct role as a method for distinguishing between fluid filled cysts and solid masses, and more recently for differentiating between malignant and benign lesions. Ultrasound also plays an important role in directing invasive diagnostic procedures such as needle and core biopsy. The utility of ultrasound is limited however because one of the main mammographic features of interest, MCs, are often invisible ultrasonically. While conventional systems can sometimes detect MCs, further improvements in visualization would significantly increase the utility of ultrasound in breast imaging. The present invention provides for an improved ultrasonic visualization of MCs thereby increasing the overall utility of ultrasonic imaging by allowing visualization of this diagnostically relevant feature.

A further advantage of the present invention is that it provides improved MC visualization which in turn would enable registration between mammograms and ultrasound images. Such image registration would allow straightforward comparison of images acquired with these different modalities and would simplify the performance of invasive diagnostic techniques such as needle and core biopsy.

In yet another advantage of the present invention, the c- and d-weighted imaging would have clinical applications and thus improve the identification of calcifications in atherosclerotic plaques. It is widely believed that the components and structure of atherosclerotic plaques are predictive of future rupture. One component of particular interest is calcified tissue. Intervascular ultrasound (IVUS) is currently the gold standard for identifying plaque calcification, however it may exhibit a low sensitivity to this important feature. Calcified regions are typically identified by their high echogenicity and posterior shadowing. Moreover, the posterior shadowing would be difficult to detect for small calcifications under conventional methods. The present invention c- and d-weighted imaging would improve IVUS' sensitivity to calcification. This would enable treatment planning which is custom tailored to specific plaque characteristics.

Further yet, another advantage of the present invention is related to the fact that the aperture geometries of the c- and d-weighted imaging are easily implemented in an IVUS system by cutting a single element cylindrically focused in elevation into three sections in elevation. For example, the middle section would be used alone to acquire backscatter data and the outer sections would be used to acquire angular scatter data.

An additional advantage of the present invention is related to the fact that the c- and d-weighted imaging in IVUS systems can prove to be easier than in traditional imaging environments because of uniform attenuation (within the blood) and a lack of phase aberrations.

What is claimed is:

1. A system for imaging a target comprising:
    a transducer array having a plurality of elements aligned along at least one of a plurality of translational axes wherein said plurality of translational axes are directed horizontally, vertically, and/or diagonally relative to the target;
    a transmitter for generating and transmitting ultrasound pulses at the target operably associated with said transducer array;
    a transmit aperture translator electrically associated with said transmitter for transmitting pulses to fire from said elements of said transducer array thereby defining a subject transmit aperture, wherein said subject transmit aperture comprises at least two preselected said elements;
    a receiver for receiving echoes of transmitted pulses operably associated with said transducer array and outputting echo signals therefrom;
    a receive aperture translator electrically associated with said receiver and for receiving pulses transmitted from said subject transmit aperture and received at said elements of said transducer array thereby defining a subject receive aperture, wherein said subject receive aperture comprises at least two preselected said elements;
    a controller for controlling said transmit aperture translator and said receive aperture translator wherein the transmission and reception are iteratively performed at least twice, wherein after each of the iterations of transmission and reception said subject transmit aperture and said subject receive aperture are translated along one of said plurality translation axes in a predetermined equal and opposite direction relative to one another; and
    a signal processor operably associated with said receiver, said signal processor adapted to receive said echo signals and perform angular scatter analysis on the echo signals after each of the second or subsequent iterations so as to provide an image signal representative of the target.

2. The system according to claim 1, further comprising:
    a beamformer operably associated with said receiver for compensating for geometric array configurations and target relationships, and for summing echoes from said receive elements.

3. The system according to claim 2, wherein said beamfarmer is applied prior to said signal processing.

4. The system according to claim 2, wherein said beamfarmer is applied after said signal processing.

5. The system according to claim 1, further comprising:
    a beamformer placed in a signal path before said signal processor and operably associated with said receiver for compensating for geometric array configurations and target relationships, and for summing echoes from said receive elements.

6. The system according to claim 1, further comprising:
    a beamformer placed in a signal path after said signal processor and operably associated with said receiver for compensating for geometric array configurations and target relationships, and for summing echoes from said receive elements.

7. The system according to claim 1, wherein said transducer array comprises said elements arranged in a line, wherein said transducer array is a linear array device, phased linear array device, or phased array device.

8. The system according to claim 1, wherein said transducer array comprises said elements arranged along a curve, wherein said transducer array is a curvilinear array device or curvilinear transducer device, whereby said transmit aperture and receive aperture are applied to the curve.

9. The system according to claim 1, wherein said transducer array comprises said elements arranged in parallel rows, wherein said transducer array is a 1.5-D array device.

10. The system according to claim 1, wherein said transducer array comprises said elements arranged in a two dimensional plane or surface, wherein said transducer array is a 2-D array device.

11. A method of imaging a target comprising the steps of:
    a) providing a transducer array having a plurality of elements aligned along at least one of a plurality of translational axes wherein said plurality of translational axes are directed horizontally, vertically, and/or diagonally relative to the target;

b) generating a subject ultrasound pulse at preselected elements of said plurality of elements to define a subject transmit aperture;

c) focusing said subject ultrasound pulse to a predetermined point on the target;

d) transmitting said subject ultrasound pulse from said subject transmit aperture to said target point;

e) receiving echoes of said transmitted pulses at preselected elements of said plurality of elements to define a subject receive aperture;

f) outputting echo signals received from said receive aperture;

g) repeating step "a" through step "f" at least one or more times, wherein after each repetition said method further comprises the additional step of:

translating said subject transmit aperture and said subject receive aperture along one of said plurality of translation axes in a predetermined equal and opposite direction relative to one another; and h) processing said echo signals to perform angular scatter analysis on the echo signals after the first or subsequent repetitions so as to provide an image signal representative of the target.

12. The method according to claim 11, further comprising the steps of: focusing and summing echoes from said receive elements.

13. The method according to claim 12, wherein:

said focusing and summing echoes from said receive elements occur before signal processing.

14. The method according to claim 12, wherein:

said focusing and summing echoes from said receive elements occur after signal processing.

15. The method according to claim 11, wherein said processing step to perform angular scatter analysis on the echo signals after the first or subsequent repetitions so as to provide an imaging signal comprises the following steps of:

a) subtracting said echo signals received during subsequent repetition from said echo signals received during first repetition to provide derived echoes; and b) scaling said derived echoes by a factor of about 1 or greater to provide D-weighted echo data.

16. The method according to claim 15, further comprising the steps of:

a) focusing and summing said D-weighted echo data; and b) displaying said focused and summed data to provide a D-weighted ultrasound image.

17. The method according to claim 15, further comprising the step of:

subtracting said derived echoes from said echo signals first received during first repetition to provide C-weighted echo data.

18. The method according to claim 17, further comprising the steps of:

a) focusing and summing said C-weighted echo data; and b) displaying said focused and summed C-weighted data to provide a C-weighted ultrasound image.

19. The method according to claim 11 wherein said signal processing comprises calculating the correlation coefficient between echoes received at different interrogations angles.

20. The method according to claim 11 wherein said signal processing comprises calculating the ratio of echoes received at different interrogations angles.

21. The method according to claim 11 wherein echo data is acquired at three or more angles and signals are processed to yield information about angular scatter.

22. The method according to claim 21 wherein said signal processing comprises fitting a polynomial curve to the echo data received as a function of angle and the parameters of said polynomial curve are displayed to indicate angular scatter information.

23. The method according to claim 21 wherein said signal processing comprises calculating certain statistics of the echo data received as a function of angle such as the mean and the standard deviation, and displaying said statistics to indicate angular scatter information.

24. The method according to claim 21 wherein said signal processing comprises utilizing matrix methods and displaying said matrix method results to indicate angular scatter information.

25. The method according to claims 11 or 21 wherein said signal processing comprises processing echo information at multiple frequencies to discern variations in angular scatter behavior as a function of frequency and displaying said frequency dependent angular scatter information.

26. The method according to claims 11 or 21 wherein said received echoes are acquired using non-linear imaging methods selected from the group consisting of a pulse inversion method and a receiving at different frequencies from transmission method.

27. The method according to claims 11 or 21 wherein said angular scatter images are formed at different frequencies and the resultant angular scatter images formed at different frequencies are averaged using a frequency compounding method.

28. The method according to claims 11 or 21 wherein two or more angular scatter images are formed with the apertures located at different positions and averaged to reduce the appearance of speckle using a spatial compounding method.

29. The method according to claims 11 or 21 wherein said received echoes are scaled, either individually or after summation, to compensate for the differential effects of frequency dependent attenuation.

30. The method according to claims 11 or 21 wherein said received echoes are scaled on a frequency dependent basis, either individually or after summations, to compensate for the differential effects of frequency dependent attenuation.

31. The method according to claims 11 or 21 wherein said received echoes are acquired using multiple translational axes.

32. The method according to claims 11 or 21 wherein said received echoes are scaled and/or filtered, either individually or after summation, to compensate for the effects of the limited angular response of practical transducer array elements.

33. The method according to claims 11 or 21 wherein a phase aberration correction method is applied to the imaging system prior to acquisition of echoes for angular scatter imaging.

34. The method according to claims 11 or 21 wherein spatially varying weightings are applied to transmit and/or receive apertures using an apodization method.

35. The method according to claims 11 or 21 wherein the size and/or weightings of the transmit and/or receive apertures are adjusted to compensate for an apparent reduction in the aperture as the angle of interrogation is altered.

36. The method according to claims 11 or 21 wherein the frequency of signal transmitted is altered with interrogation angle to improve speckle coherence at these multiple angles.

* * * * *